United States Patent [19]
Estes et al.

[11] 3,916,871
[45] Nov. 4, 1975

[54] FLAT PLATE SOLAR COLLECTOR MODULE

[76] Inventors: James M. Estes, 3533 Westfield, Fort Worth, Tex. 76133; Eliot E. Kerlin, 2310 Primrose, Fort Worth, Tex. 75040; Harold A. Blum, 3501 Milton, Dallas, Tex. 75205

[22] Filed: June 26, 1973

[21] Appl. No.: 373,795

[52] U.S. Cl. .................................. 126/271; 165/81
[51] Int. Cl. .............................................. F24j 3/02
[58] Field of Search .............. 126/270, 271; 165/81

[56] References Cited
UNITED STATES PATENTS

| | | | |
|---|---|---|---|
| 1,345,758 | 7/1920 | Folsom | 126/271 |
| 1,946,184 | 2/1934 | Abbot | 126/271 |
| 2,208,789 | 7/1940 | Cally | 126/271 |
| 2,566,327 | 9/1951 | Hallock | 126/271 UX |
| 3,076,450 | 2/1963 | Gough et al. | 126/271 |
| 3,227,153 | 1/1966 | Godel et al. | 126/271 |
| 3,239,000 | 3/1966 | Meagher | 126/271 |

*Primary Examiner*—William F. O'Dea
*Assistant Examiner*—Peter D. Ferguson
*Attorney, Agent, or Firm*—Richards, Harris & Medlock

[57] ABSTRACT

Disclosed is an improved flat plate solar collector module for use in a solar energy utilization system. Each collector has a housing with an evacuated chamber defined therein. A transparent planar wall forms one side of the chamber and a radiant energy absorber with flow passages therein is supported within the chamber thermally insulated from the housing. Heat exchanger flow conduits extend from the absorber and through the housing without contacting the walls of the housing to allow circulation of heat exchange fluid through the absorber with minimal conduction heat losses.

6 Claims, 9 Drawing Figures

FLAT PLATE SOLAR COLLECTOR MODULE

BACKGROUND OF THE INVENTION

The present invention relates to solar energy collectors. In another aspect, this invention relates to an improved solar collector module with a flat plate absorber which is supported within an evacuated chamber without substantial heat conduction contact between the absorber and the housing. In another aspect, this invention relates to an improved fluid connection configuration for adjacent modules interconnecting the individual modules to form a series-type of solar collector bank.

It has long been recognized that radiant solar energy reaching the earth is an enormous quantity of energy which can be utilized without the undesirable environmental effects present in the production of energy by most conventional sources. To use this energy source, solar collector systems have been proposed which utilize solar radiation to heat a fluid and thereafter either store or use this heated fluid in the production of steam for industrial uses or for powering heating, air-conditioning or the like.

It is necessary that solar collectors be operated efficiently at elevated temperatures so that they can supply fluid at a temperature in the range of 100°C. to 150°C. to be widely applicable for many uses. It is also envisioned that in exceptional cases such as no load conditions the temperature of the absorber itself could reach 320°C. or more.

It has been found that most solar collectors which can operate at these high temperatures do so at a low efficiency and therefore cannot be economically utilized. To increase the efficiency of these solar collectors it is necessary to increase the percentage of the incident energy reaching the absorber and to reduce the energy losses due to such factors as conduction, convection and radiation.

It has been found that flat plate collectors compare favorably with other types of collectors in the percentage of incident radiation reaching the absorber.

To reduce convection losses various complex structures were developed and devised, such as shown in the patent to Godell et al, U.S. Pat. No. 3,227,153 issued Jan. 4, 1966, in which the absorber was enclosed within an evacuated chamber to reduce the convection losses between the absorber and the atmosphere. A similar structure is illustrated in the patent to Coxe, U.S. Pat. No. 1,814,897 issued July 14, 1931.

Although the above described systems have assisted in solving problems present in the design of an efficient solar collector they have not proved entirely satisfactory under all conditions of service for the reason that considerable difficulty has been experienced in providing a structure which could be used with a reasonable size evacuated flat plate collector.

In addition, due to the high operating temperature of the absorbers, heat resistant materials are required in the collector to mount the absorber preventing the use of low-cost, easily manufactured materials.

Therefore, according to one embodiment of the present invention, a solar collector with a flat plate absorber suspended in an evacuated chamber is provided. The absorber and its associated conduits are thermally isolated from the walls of the collector to allow the use of non-heat resistant materials in the construction thereof.

The advantages of the present invention will be readily appreciated by those of ordinary skill in the art by reference to the following detailed description and accompanying drawings in which:

DESCRIPTION OF THE PREFERRED EMBODIMENT

Figure 1:
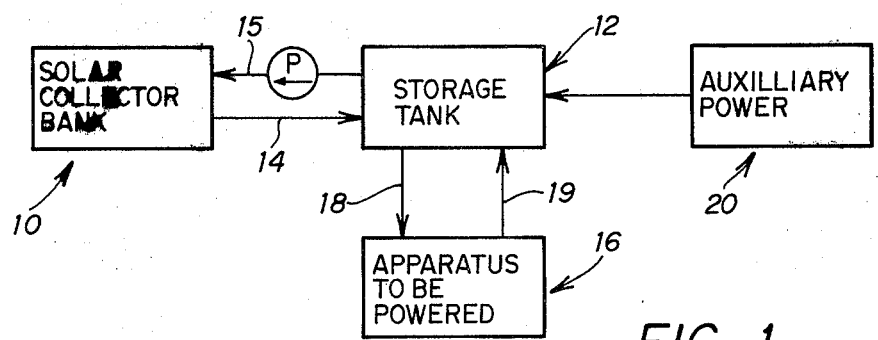
FIG. 1 is a diagram of a solar energy utilization system.

Referring now to the drawings wherein like reference characters designate like or corresponding parts throughout the several views there is illustrated in FIG. 1 an energy utilization system and its associated enclosed flat plate solar collector bank 10. Bank 10 is an apparatus which when placed in the incident sun radiation converts the radiation to heat and transfers the heat to a heat exchange fluid. This heat exchange fluid is circulated between bank 10 and a storage tank 12 by means of conduits 14 and 15 and a suitable fluid pump. Storage tank 12 provides a convenient means of storing heat with the heated fluid stored in tank 12.

The term "enclosed flat plate solar collector" is used in a generic sense to describe those types of collectors which have a planar absorber element enclosed in a housing. The cover of the housing is parallel to the absorber and transmits solar energy.

When in use the heat level of the fluid in tank 12 is increased during the day as heat is collected. Tank 12 has a sufficient volume to store thermal energy for use at a later time. Apparatus 16 can be a heating or air-conditioning system for a home, apartment and the like, or can be used to heat a swimming pool, or can provide steam for industrial use.

For an example, during winter, heated heat exchange fluid can be drawn directly from the tank 12 to supply heating for living quarters. For summer cooling, the heated fluid can be drawn from the tank and piped through an absorption refrigeration apparatus which uses the hot fluid as an energy source to produce chilled water. The chilled water from the apparatus can then be piped to living quarters to provide the cooling.

Apparatus 16 is connected to tank 12 by conduits 18 and 19 to allow for operation of apparatus 16. Heat stored in the tank 12 can be used to operate apparatus 16 through the night and if cloudy into the next day. It is sometimes necessary to operate an auxiliary power source 20 which can be used to add additional energy in the form of heat to storage tank 12.

It is also envisioned that a first fluid such as ethylene glycol could be used and circulated through the solar collector, conduits 14 and 15 and through a heat exchanger in storage tank 12. A separate fluid such as water could be provided in the storage tank and circulated through the heat exchanger to absorb energy from the first fluid.

Figure 2:
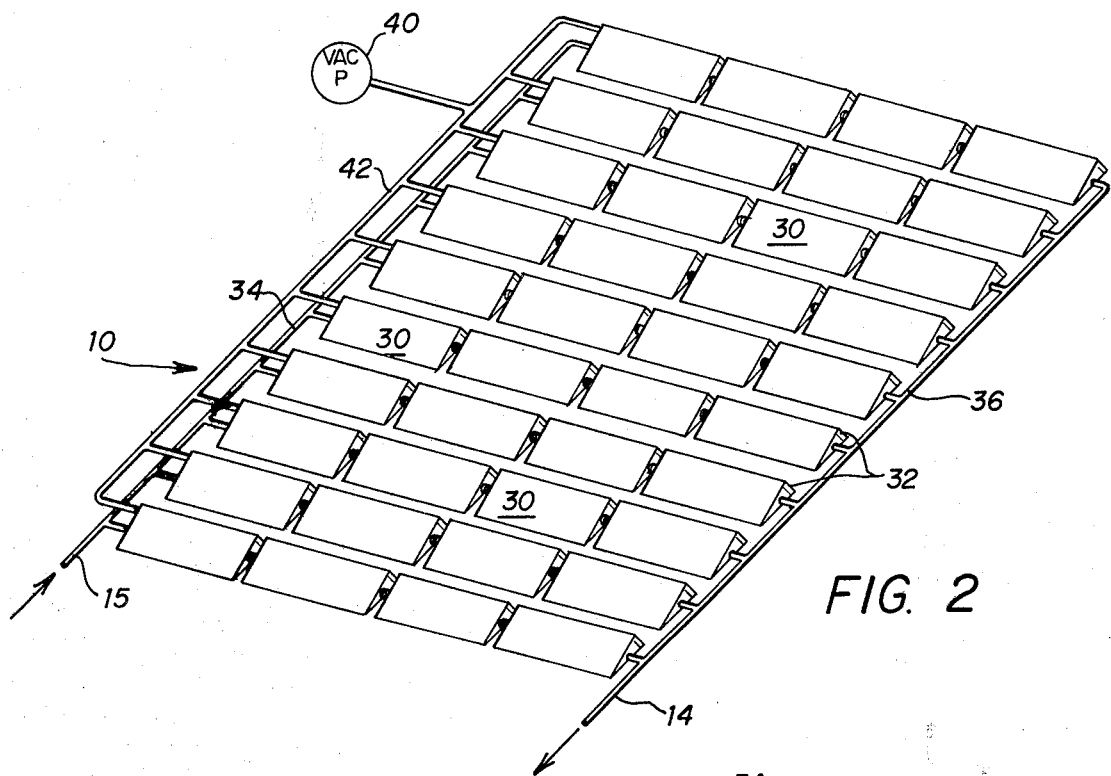
FIG. 2 is a perspective view of a solar energy collector bank.

Turning now to FIG. 2, a typical solar collector bank 10 is illustrated. Bank 10 can be installed on the roof or side of a building or over a vacant area, parking lot, swimming pool, or the like, such that radiation from the sun will be incident on the bank 10. In the present embodiment, bank 10 is constructed from a plurality of separate enclosed flat plate collector modules 30 which are supported on stand assemblies 32. These stand assemblies 32 are designed to support modules 30 in an attitude which maximizes the quantity of solar radiation thereon during the day. Alternatively, movable supports can be provided to adjust the attitude of the modules from time to time to further increase the amount of incident radiation.

A plurality of sets having four modules 30 connected in series are provided in each bank. It is envisioned, of course, that other numbers and arrangements of modules 30 could be used. Each of the sets of modules 30 is connected between a heat exchange fluid supply manifold 34 and heat exchange fluid return manifold 36. Manifolds 34 and 36 are connected by conduits 15 and 14, respectively, to the storage tank 12 to provide a circulation path for the heat exchange fluid between bank 10 and tank 12.

A vacuum pump 40 is connected through suitable conduits 42 to chambers formed in each of the collector modules 30 to evacuate the same from time to time as is necessary. It is anticipated that a vacuum in the area of one torr (1 mm of Hg) would be used.

This pressure level is readily achieved and maintained. Convection losses can be neglected at large spacings between the cover and the absorber (e.g., 6 inches). With the combination of negligible convection plus large spacing (e.g., greater than 2 inches) conduction losses through the gas also become very small. To use the very low pressures that essentially eliminate gas thermal conductivity requires a technology not commercially feasible for massive areas.

Figure 3:
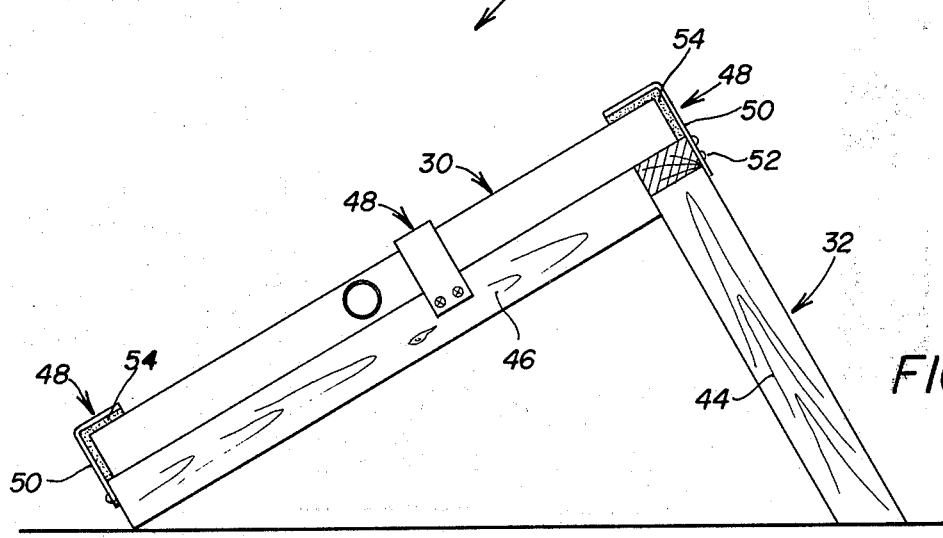
FIG. 3 is a side elevation of the improved solar energy collector module of the present invention.
Figure 4:
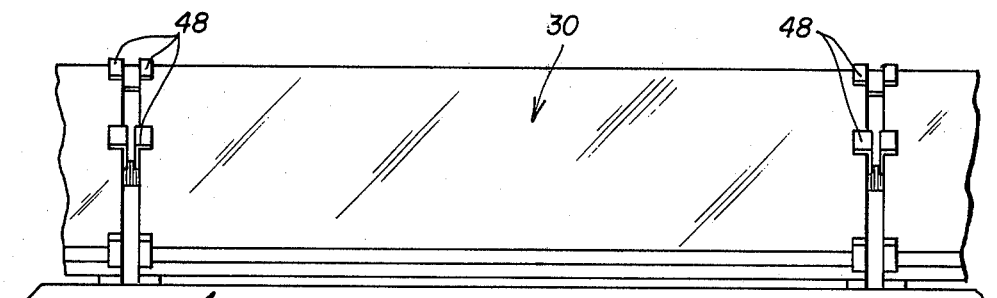
FIG. 4 is a front elevation of the improved collector module illustrated in FIG. 3.
Figure 5:
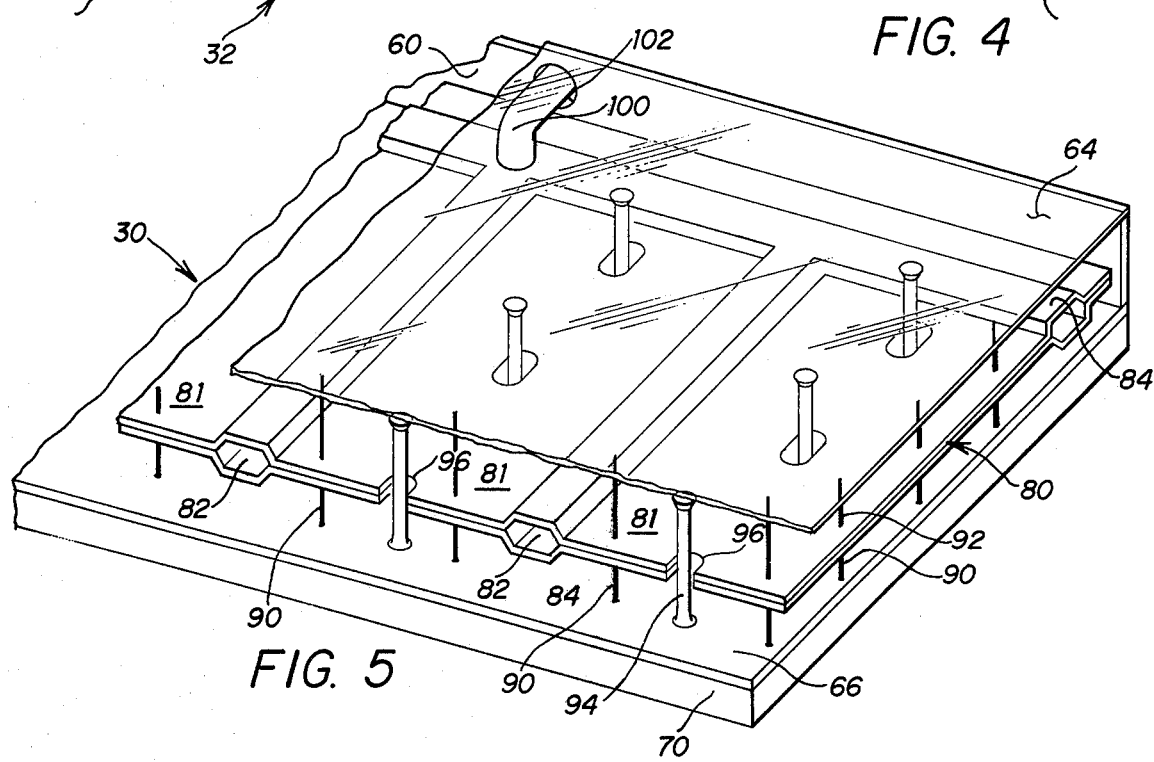
FIG. 5 is a perspective view partially in section of the collector module of the present invention.
Figure 7:
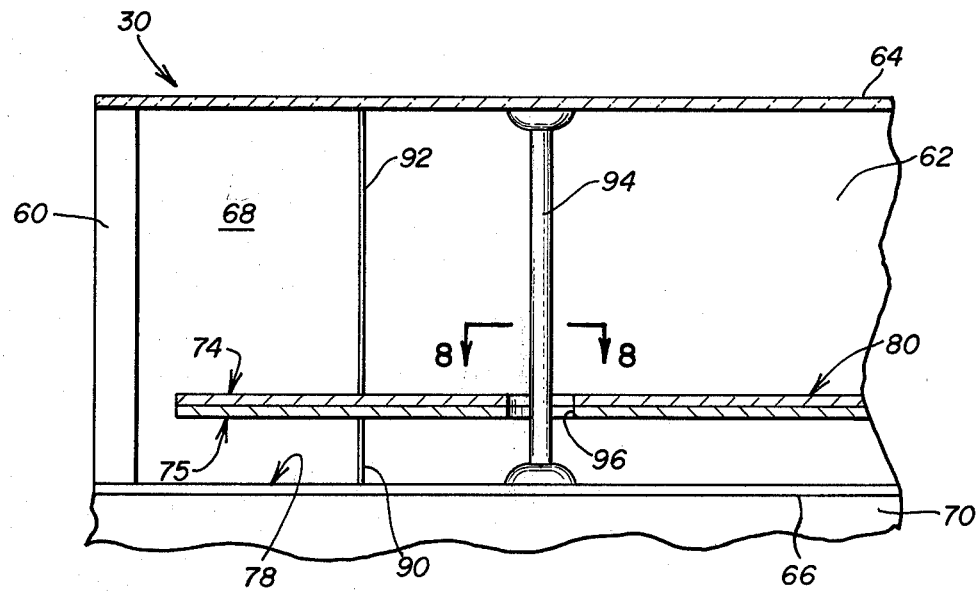
FIG. 7 is an enlarged section of the module taken on line 7—7 of FIG. 6 looking in the direction of the arrows.
Figure 6:
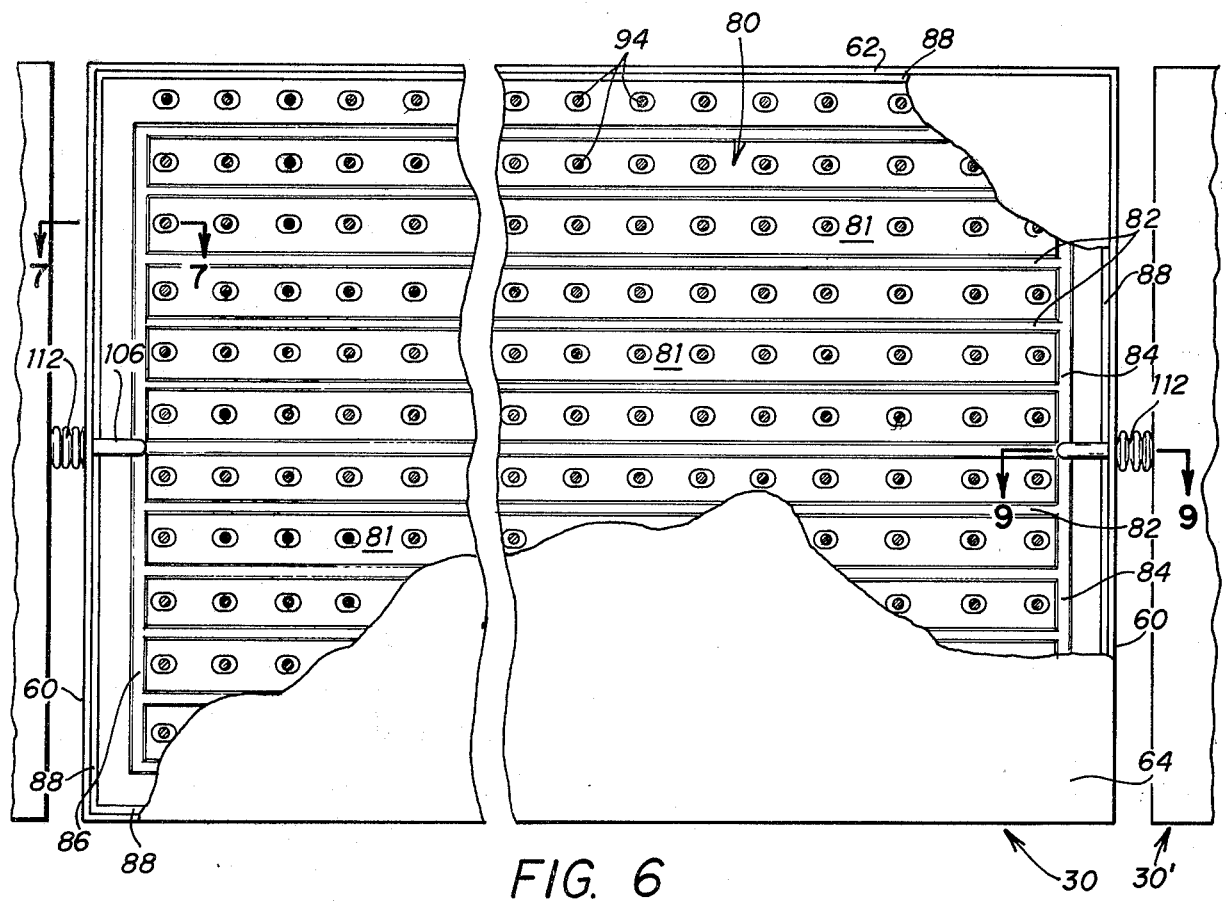
FIG. 6 is a plan view of the improved solar collector module of the present invention with a portion of the cover removed for purposes of illustration.

In FIGS. 3 and 4 module 30 is illustrated supported by stand assembly 32. Each stand 32 is provided with a leg 44 and a lower support 46 which are suitably affixed together by fasteners or the like.

A plurality of mounting clip assemblies 48 are provided for removably fixing modules 30 to assembly 32. These clips 48 each have an L-shaped metal bracket 50, with one flange attached to assembly 32 by means of suitable fasteners 52. The other leg of bracket 50 is lined with a compressible material 54 such as rubber or the like to resiliently contact module 30.

In FIGS. 5-9 the details of the construction of the improved flat plate solar collector module 30 of the present invention is illustrated. Module 30 has a housing 58 which is assembled with a pair of parallel spaced planar endwalls 60 which are connected to a pair of parallel spaced sidewalls 62 to form a quadrilateral shaped member. In the preferred embodiment, endwalls 60 are approximately 1.3 meters long and sidewalls 62 are approximately 2.6 meters long to form an elongated shaped member as illustrated. A planar upper cover 64 is attached to the quadrilateral shaped member formed by walls 60 and 62. This cover 64 is constructed from radiation transmission material to allow radiant energy to enter the chamber formed in module 30.

A bottom wall 66 is attached to walls 60 and 62. This wall 66 with walls 60, 62 and cover 64 defines a chamber 68. A material 70 insulates the outside surface of wall 66 and can be formed from any suitable heat insulating material.

In FIGS. 5-8 a heat absorber assembly 80 is shown positioned within the chamber 68. The absorber 80 is of the flat plate type and has planar portions 81 for receipt of the incident solar radiation with a plurality of fluid flow paths therein for circulating heat exchange fluid through the absorber 80. In operation, portions 81 are heated by solar radiation and heat is transferred to and carried away by the circulation of the heat exchange fluid. The absorber assembly 80 can be formed from two sheets of material which are laminated as illustrated to form a plurality of parallel conduits 82 which extend along the length thereof. Each of the conduits 82 is connected at opposite ends to manifolds 84 and 86 formed in the absorber. As will be hereinafter described in more detail, manifold 86 is appropriately connected to a supply of heat exchange fluid to receive and distribute the fluid to conduits 82. Manifold 84 is positioned at the opposite end of conduits 82 to receive the heat exchange fluid flowing therefrom and convey the same from module 30.

It is important to note that absorber 80 is smaller than chamber 68 and a small clearance 88 is provided between the absorber and housing 58. This clearance 88 prevents contact between absorber 80 and walls 60 and 62 to prevent conduction heat transfer and losses from absorber 80 to housing 58 and prevents the absorber from imposing stresses in the housing due to thermal expansion.

It is envisioned, of course, that other constructions of the absorber could be utilized which do not require the lamination of two sheets of material.

The module 30 can be constructed from any suitable material which is structurally sound and sufficiently impermeable to hold a vacuum in the chamber 68 for a reasonable period of time. In the present embodiment moldable opaque plastic material was used for walls 60, 62 and 66. A transparent plastic material which adequately transmits solar radiation was used for cover 64. The walls 60, 62 and 66 and cover 64 are attached together in any suitable manner to provide a seal between the individual walls. In the preferred embodiment, it was envisioned that walls 60, 62 and 66 could be integrally molded as a unitary piece with cover 64 removably attached to the unitary piece to allow assembly and maintenance of the interior of the modules.

The absorber 80 can be constructed from any suitable material such as metal, plastic or the like, which can withstand the operating temperatures thereof; can efficiently conduct heat; and can have suitable heat transfer coatings thereon. In the preferred embodiment, aluminum was used for the construction of the absorber with a coating on upper surface 74 of high solar absorptivity and low radiation emissivity at the operating temperatures on the upper surface 74. The lower surface 75 has a coating or finish with a low radiation emissivity at the operating temperatures. Surface 78 of the wall 66 and the interior surfaces of walls 60 and 62 were provided with a highly reflective coating thereon.

Absorber 80 is supported above the lower wall 66 by means of a plurality of lower support pins 90. Pins 90 are constructed with a very small diameter and have sufficient columnar strength to hold the absorber assembly 80 supported in the position illustrated above the lower wall 66. If desired, upper support pins 92 can also be provided between absorber assembly 80 and upper wall 64 to assist in holding absorber assembly 80 in position during transport, installation and the like. It is envisioned that these upper pins 92 could be removed at installation of the module to prevent any unnecessary conduction heat transfer therethrough to the upper wall 64.

Support pins 90 in the present embodiment are constructed from metallic material which has a very small diameter in the range of 0.127 cm to restrict and inhibit conduction heat transfer between the absorber and the lower wall 66. It is envisioned, of course, that other configurations for supporting the absorber in a thermally isolated position from the housing could be provided. It is important to note that the pins 90 have a particular advantage in providing flexibility in directions transverse to their length to allow for relative thermal expansion between the housing and the absorber during operation without imparting substantial stresses to the housing itself.

Due to the fact that the chamber 68 is evacuated during use, a plurality of spaced compression supports 94 are mounted within the chamber 68 to assist in resisting bending and deformation of the cover and lower wall 64 and 66, respectively, due to the forces generated by differential pressure across the chamber walls. The lower wall 68 can be constructed as thick and as rigid as desirable but any thickening or bracing of the upper wall must be kept to a minimum to prevent blocking of incident radiation entering through the upper wall.

The compression members 94 in the preferred embodiment were constructed from a plastic material of the like with a diameter in the range of 0.254 cm except at the top and bottom of the chamber where the diameter is larger to prevent stress concentrations.

It is envisioned that the compression members 94 could be integrally molded when forming the housing 58. The members 94 are attached to the lower wall 66 but their upper ends are not attached to the cover 64 to allow removal of the upper wall and to reduce the buildup of stresses.

A plurality of elongated slots 96 are provided in absorber 80 to prevent contact between the compression members 94 and the absorber 80. These slots eliminate conduction heat transfer and losses from the absorber to the relatively massive compression members.

Figure 8:
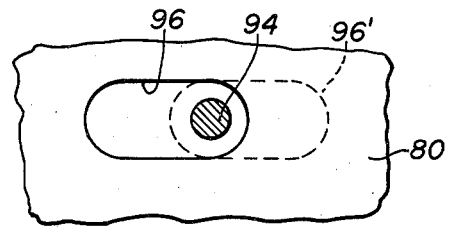
FIG. 8 is a partial enlarged sectional view taken on line 8—8 of FIG. 7 looking in the direction of the arrows.

As can be seen in FIG. 8 elongated slot 96 allows for thermal expansion of the absorber 80. The slot outlines 96 and 96' illustrate the extremes of movement of the absorber 80 due to thermal expansion during normal operating temperatures.

By designing the compression members 94 such that they do not contact absorber 80, conduction heat losses through these massive compression members is prevented. By combining this structure and support pins 90, the efficiency of the module 80 is increased.

Figure 9:
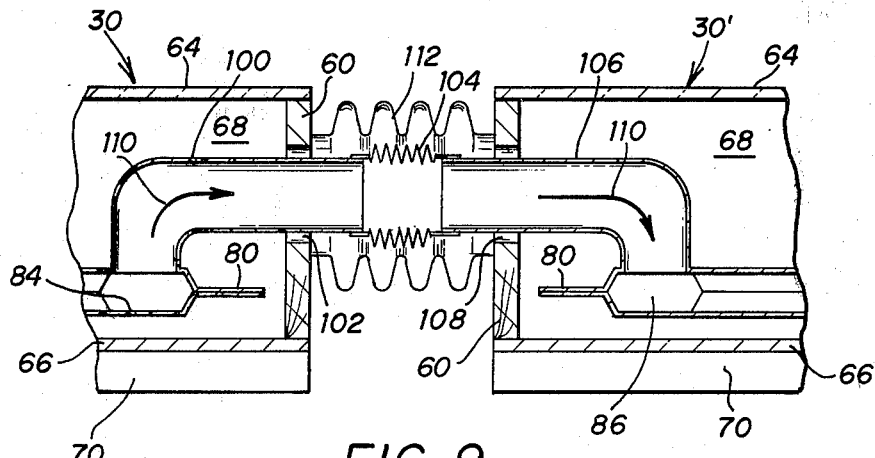
FIG. 9 is an enlarged section of the device taken on line 9—9 of FIG. 6 looking in the direction of the arrows.

Interconnection of adjacent modules 30 and 31 for circulation of the heat exchange fluid is illustrated in FIG. 9. In this FIGURE manifold 80 of a first module 30 is illustrated with a conduit 100 in fluid communication with manifold 84. Conduit 100 extends through an enlarged port 102 in endwall 60 without contacting wall 60. A bellows connection 104 is provided between conduit 100 and a second conduit 106. Conduit 106 in turn extends through an enlarged port 108 in wall 60 of a second module 30' without contacting wall 60. This conduit 106 is in fluid communication with manifold 86 of the absorber assembly therein. By connecting the absorber 80 of modules 30 and 30' in this manner heat exchange fluid can flow from manifold 84 of module 30 through conduit 100, bellows 104, conduit 106 and into manifold 86 of module 30'.

The bellows 104 allows for relative axial movement between the absorber assemblies due to variations in temperature thereof. In addition, some relative movement between the modules 30 and 30' is allowed by this bellows configuration.

A second bellows 112 is positioned concentrically around bellows 104 and conduits 100 and 106 and is sealed and attached between walls 60 of modules 30 and 30'. In this manner the evacuated chambers 68 of the modules are connected while some relative movement between modules 30 and 30' is permitted.

A similar configuration can be used to connect the modules to the manifolds 34 and 36. For example, a bellows could be provided for connection of the heat exchange fluid conduit to the appropriate manifold and a larger concentrically mounted bellows can be connected between the periphery of the port and the exterior of the conduit to seal the chamber 68.

The improved collector of the present invention is designed to be normally operated between 250° and 300° F. at a desirable efficiency with a normal operating load. It is also envisioned that during some periods of operation such as during no load condition that the absorber will reach temperatures in the neighborhood of 600° F. In the design of the absorber itself these wide temperature variations need to be taken into consideration in the selection of suitable material, but this is not necessary in the selection of materials in the construction of the housing. This is due to the fact that the physical separation of the absorber and its associated fluid flow conduits from the housing as disclosed in the present application prevents the housing from contacting the absorber. This physical isolation of the absorber in combination with the evacuation of the chamber insulates the housing from the absorber and allows the use of unsophisticated materials which need not have a temperature tolerance within the operation range of the absorber itself.

In addition to reducing conduction losses evacuation of the chamber tends to extend the life of the coating on the absorber and prevents chemical and weather deterioration of the absorber itself. It is also envisioned that the residual gases other than air could be inserted in the chamber to further reduce heat losses from and deterioration of the surface of the absorber.

It is to be understood, of course, that the foregoing description relates only to a preferred embodiment of the present invention and that numerous modifications and alterations can be made therein without departing from the spirit and scope of the invention as set forth in the appended claims.

What is claimed is:

1. A collector assembly comprising:

a pair of adjacent solar collectors, each of said collectors having a housing defining a sealed evacuated chamber, at least a portion of said housing being constructed to transmit radiant energy into said chamber;

an absorber mounted in each of said chambers to receive said radiant energy entering said chamber;

flow conduits extending through each of said chambers in heat conduction contact with said absorbers for transferring heat from said absorbers to a heat exchange fluid flowing through said conduits, said housings having enlarged ports therein;

a first interconnecting conduit means interconnecting and extending between the flow conduits of said adjacent collectors, said first means extending through said enlarged ports in said housings; and a second interconnecting conduit means sealed around the exterior of said ports and surrounding said first means.

2. A collector assembly as defined in claim 1 wherein each of said solar collectors additionally comprises a plurality of compression members in said chamber contacting said energy transmitting portion of said housing at points spaced away from the edges of said cover thereby resisting deflection of said cover due to the differential pressure across said cover and wherein said absorber has clearance openings therein of a size and shape to prevent contact with said compression members during operation of said collector to thereby reduce conduction losses from said absorber.

3. A collector assembly as defined in claim 1 wherein said solar collectors are flat plate type collectors.

4. A collector assembly as defined in claim 1 wherein said transmitting portion of said housing is a planar cover of transparent material.

5. A collector assembly as defined in claim 2 wherein said compression members comprise columns which extend across said chamber.

6. A collector assembly as defined in claim 5 additionally comprising insulation members contacting and supporting said absorber in a position spaced from said housing, said insulation members being constructed to minimize conduction heat transfer therethrough.

* * * * *